(12) United States Patent
Iizuka

(10) Patent No.: US 6,246,520 B1
(45) Date of Patent: *Jun. 12, 2001

(54) OPTICAL APPARATUS

(75) Inventor: Toshimi Iizuka, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/906,107

(22) Filed: Aug. 5, 1997

Related U.S. Application Data

(63) Continuation of application No. 08/567,065, filed on Dec. 4, 1995, now abandoned, which is a continuation of application No. 08/093,700, filed on Jul. 20, 1993, now abandoned.

(30) Foreign Application Priority Data

Jul. 24, 1992 (JP) .................................................. 4-198682

(51) Int. Cl.[7] ............................. G02B 27/64; G02B 23/00
(52) U.S. Cl. ........................ 359/557; 359/407; 359/431; 359/554
(58) Field of Search ....................... 359/832, 399–400, 359/431, 407, 554–557, 831–837, 678; 396/52–55; 348/208

(56) References Cited

U.S. PATENT DOCUMENTS

| 3,503,663 | * | 3/1970 | de la Cierva | 359/557 |
| 3,608,995 | * | 9/1971 | Humphrey | 359/557 |
| 3,942,862 | * | 3/1976 | Furukawa et al. | 359/557 |
| 4,013,339 | * | 3/1977 | Ando et al. | 359/556 |
| 4,063,261 | * | 12/1977 | Kuboshima et al. | 354/225 |
| 5,042,930 | * | 8/1991 | Hutt | 359/407 |
| 5,140,462 | * | 8/1992 | Kitagishi | 359/557 |
| 5,182,671 | * | 1/1993 | Kitagishi et al. | 359/557 |
| 5,311,367 | * | 5/1994 | Ohki et al. | 359/557 |
| 5,315,435 | * | 5/1994 | Horiuchi | 359/557 |
| 5,661,597 | * | 8/1997 | Sugawara | 359/557 |
| 5,672,862 | * | 9/1997 | Ohara et al. | 359/557 |

FOREIGN PATENT DOCUMENTS

| 505058 | | 1/1975 | (JP) . | |
| 205621 | * | 11/1967 | (RU) | 359/431 |

* cited by examiner

Primary Examiner—Thong Nguyen
(74) Attorney, Agent, or Firm—Fitzpatrick, Cella, Harper & Scinto

(57) ABSTRACT

This invention relates to an optical apparatus for observation which is provided with drive control means for driving a variable angle prism on the basis of an output signal from vibration detecting means and in which the variable angle prism is installed between an objective lens and an erect prism.

6 Claims, 1 Drawing Sheet

OPTICAL APPARATUS

This application is a continuation of application Ser. No. 08/567,065, filed Dec. 4, 1995, now abandoned, which in turn is a continuation of application Ser. No. 08/093,700, filed Jul. 20, 1993, now abandoned.

BACKGROUND OF THE INVENTION

1. Field of the Invention

This invention relates to an optical apparatus for observation such as a telescope having the image vibration correcting function of detecting the amount of vibration of the optical apparatus, and deflecting the optical axis of the optical apparatus so as to hold the optical image of the optical apparatus always at a predetermined position on the basis of the detection output.

2. Related Background Art

As an apparatus for eliminating the image vibration of an optical apparatus for observation, there are known binoculars with an image stabilizer as described in Japanese Laid-Open Patent Application No. 50-5058 wherein a gyroscope is connected to an erect prism supported by gimbals.

However, in the image stabilizer using a gyroscope, the rotor of the gyroscope is rotated at a high speed and therefore, much time is required before a motor is fully rotated, and since the prism is floating-supported by gimbals mechanism, sudden panning or tilting, when effected, causes the prism to strike against the inner wall of the optical apparatus, and this has caused a trouble in some cases. Also, after the use of the apparatus, it is necessary to effect the caging of the gyroscope and operation is cumbersome. Further, the gyroscope requires a certain degree of mass, and this has led to the disadvantage that the optical apparatus itself becomes heavy and bulky.

SUMMARY OF THE INVENTION

According to the present invention, a variable angle prism for changing the optical axis of an observation optical system is disposed between the objective lens of the observation optical system and an erect prism and the vertical angle of the variable angle prism is controlled in conformity with the vibration of an optical apparatus to thereby stabilize an optical image at a predetermined position and enable an object to be observed in a good condition free of image vibration.

DESCRIPTION OF THE PREFERRED EMBODIMENT

In an optical apparatus having an objective lens, a lens for observation and an erect prism, provision is made of vibration detecting means for detecting the amount of vibration of the optical apparatus, a variable angle prism which is means for changing the extended optical axis of said objective lens, and drive control means for driving said variable angle prism on the basis of an output signal from said vibration detecting means, and said variable angle prism is installed between said objective lens and said erect prism.

Figure 1:
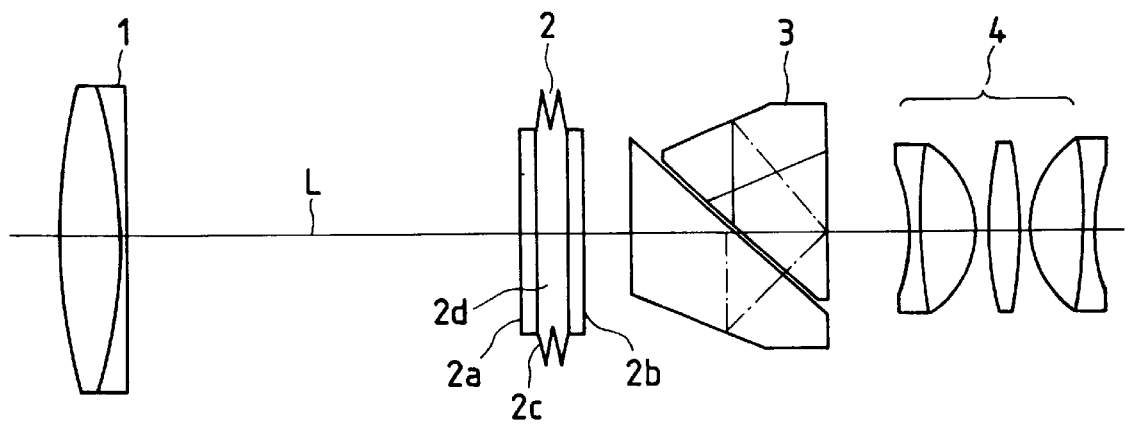
FIG. 1 is a cross-sectional view of a telephoto optical system according to an embodiment of the present invention.

FIG. 1 shows the optical cross-section of a telephoto optical system which is an embodiment of the present invention.

In FIG. 1, the reference numeral 1 designates an objective lens for forming the image of an object. In some cases, the objective lens is divided into multiple groups. The letter L denotes the optical axis of the optical system. The reference numeral 2 designates a variable angle prism (hereinafter referred to as the VAP) which is means for changing the optical axis (or the optical path). The VAP 2 is of a construction in which liquid 2d having a uniform refractive index is enclosed in a bellows vessel 2c having its opposite ends adhesively secured to two transparent plates 2a and 2b.

The reference numeral 3 denotes an erect prism comprising two prisms spaced apart by a minute distance from each other. The forward prism has an inclined surface on the lower side thereof, and the rearward prism has a roof surface on the upper side thereof. This erect prism has the action of inverting an image vertically and rendering the image erect, and if it has a roof surface, the right and left will also be inverted. The prisms may be deformed.

The reference numeral 4 designates an eyepiece for observing therethrough the image formed by the objective lens 1. The objective lens 1, the variable angle prism 2, the erect prism 3 and the eyepiece 4 are disposed coaxially with the optical axis L.

Figure 2:
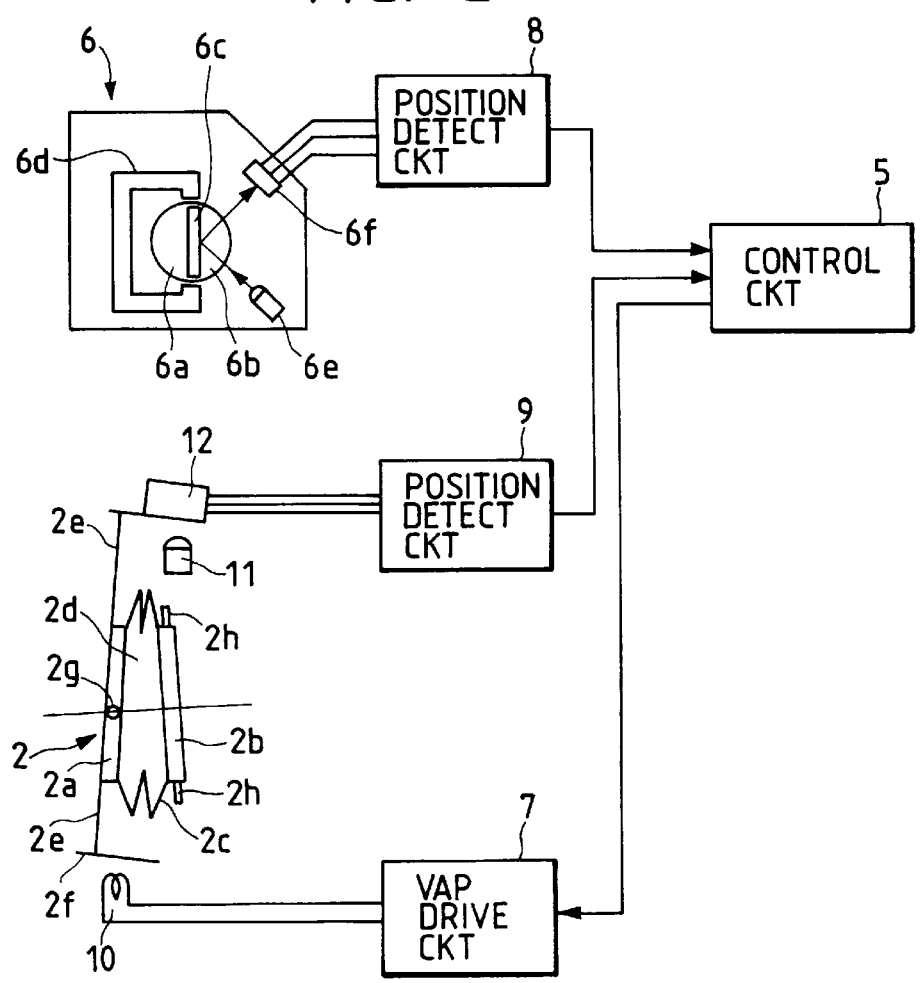
FIG. 2 is a block diagram showing the driving system of a construction unit.

FIG. 2 is a block diagram showing a driving method for the variable angle prism 2. In FIG. 2, the reference numeral 5 designates a control circuit comprising a microcomputer or the like which governs the vertical angle deflection drive control of the VAP 2, and the reference numeral 6 denotes a detecting sensor which is vibration detecting means for detecting the vibration of the telephoto optical system and which is mounted on a portion of a telescope body, not shown. Although detailed description of the vibration detecting sensor 6 is omitted because this sensor is not directly related with the present invention, a cylindrical case 6a is filled with liquid 6b having a predetermined refractive index, and a reflective float member 6c rotatable about a predetermined rotational axis is provided in the liquid 6b. This float member 6a is adapted to be held at a predetermined position when there is no vibration, by a close magnetic circuit consisted of a permanent magnet 6d provided so as to surround the case 6a. Design is also made such that when vibration occurs to the telescope body and the float member 6c rotates relative to the case 6a, the position of a spot light emitted from a light emitting element 6e, reflected by the surface of the float member 6c and entering a light receiving element 6f for position detection is varied. Thus, in conformity with the amount of vibration of the telescope body, the position of incidence of the light onto the light receiving element 6f is varied and the output signal thereof is varied. The output signal from the light receiving element 6f is output to the above-described control circuit 5 through a position detecting circuit 8 for detecting the position of the light spot. This output is representative of the angle of rotation of the telescope.

On the other hand, the VAP 2 is disposed between the objective lens 1 and the erect prism 3 and in proximity to the erect prism, and a magnetic circuit 10 is driven by a VAP drive circuit 7 controlled by the control circuit 5 in conformity with the output of a position detecting circuit 8 adjacent to the vibration detecting sensor 6, whereby a magnetic plate 2f secured to a support plate 2e coupled to the transparent plate 2a of the VAP 2 which is adjacent to the objective lens is moved and the transparent plate 2a is tilted. The magnetic plate 2f is supported on the telescope body, not shown, by a rotary shaft 2g protruded from the transparent plate 2a. Also, the amount of tilt of the transparent plate 2a is detected by a detector which comprises a light emitting element 11 and a light receiving element 12 and detects at what position on the light receiving surface of the light receiving element 12 the spotlight of the light emitting element 11 lies, and the output signal thereof is output to the control circuit 5 through a position detecting circuit 9. At that time, the control circuit 5 controls the VAP drive circuit 7 and drives the magnetic circuit 10 so that the difference between the output of the position detecting circuit 8 adjacent to the vibration detecting sensor 6 and the output of the position detecting circuit 9 adjacent to the VAP 2 may be "0", and tilts the transparent plate 2a of the VAP 2. Although not shown, the transparent plate 2b of the VAP 2 can be tilted in a direction orthogonal to the direction of tilt of the transparent plate 2a, by a method similar to the method described above with respect to the transparent plate 2a. The numeral 2h designates a rotary shaft provided in the transparent plate 2b. In this manner, the vertical angle of the variable angle prism 2 is two-dimensionally varied, whereby the optical axis can be deflected in a direction to suppress the vibration of image created by the vibration of the telephoto optical system and as a result, the user of the telephoto observation apparatus can obtain a stable image free of vibration. If design is made such that a TV camera can be mounted rearwardly of the eyepiece 4, an object will conveniently become observable by a TV monitor.

As described above, the variable angle prism is disposed in the ray converging portion rearward of the objective lens, whereby there can be realized an optical apparatus in which the variable angle prism may be compact and which is excellent in the frequency characteristic which is one of image stabilizing performances. Also, by the variable angle prism being disposed forwardly of the erect prism, there is provided an advantage that the expensive erect prism need not to become bulky. Thus, by using the variable angle prism, there is obtained the effect that there can be relatively inexpensively manufacture an observation apparatus with an image stabilizer which is compact and light in weight as compared with the aforedescribed example of the prior art.

What is claimed is:

1. An optical apparatus for observation comprising:

objective lens means;

eyepiece means;

prism means for reflecting a light beam from said objective lens means to direct the light beam to said eyepiece means;

variable angle prism means disposed between said objective lens means and said prism means, at a ray-converging portion rearward of said objective lens means and forward of said prism means, for changing a direction of the light beam from said objective lens means;

shake detecting means for detecting a shake of said optical apparatus; and drive controlling means for driving said variable angle prism means based on an output signal from said shake detecting means.

2. An optical apparatus for observation according to claim 1, wherein said prism means erects an image formed by said objective lens means.

3. An optical apparatus for observation comprising:

objective lens means;

eyepiece means;

prism means for reflecting a light beam from said objective lens means to direct the light beam to said eyepiece means, said prism means being an erect prism comprising two prisms spaced apart from each other, a forward prism having an inclined surface and a rearward prism having a roof surface thereof;

variable angle prism means disposed between said objective lens means and said prism means, at a ray-converging portion rearward of said objective lens means and forwardly of said prism means, for changing a direction of the light beam from said objective lens means to said prism means, said variable angle prism means comprising a bellows vessel containing a liquid having a uniform refractive index, and said bellows vessel being enclosed at opposite ends by a first transparent plate disposed on the objective lens means side of said bellows vessel and a second transparent plate disposed on the prism means side of said bellows vessel;

shake detecting means for detecting a shake of said optical apparatus; and drive controlling means for driving said variable angle prism means to control a vertical angle thereof based on an output signal from said shake detecting means.

4. An optical apparatus for observation according to claim 3, wherein said variable angle prism means is disposed adjacent to said prism means.

5. An optical apparatus for observation according to claim 3, wherein said drive controlling means controls the vertical angle of said variable angle prism means by causing said first transparent plate to tilt.

6. An optical apparatus for observation according to claim 3, wherein said drive controlling means controls the vertical angle of said variable angle prism means by causing a transparent plate of said variable angle prism means to tilt.

* * * * *

UNITED STATES PATENT AND TRADEMARK OFFICE
CERTIFICATE OF CORRECTION

PATENT NO.    : 6,246,520 B1
DATED         : June 12, 2001
INVENTOR(S)   : Toshimi Iizuka It is certified that error appears in the above-identified patent and that said Letters Patent is hereby corrected as shown below:

<u>Column 3,</u>
Line 40, "manufacture" should read -- manufactured --.

Signed and Sealed this

Fourth Day of June, 2002

Attest:

JAMES E. ROGAN
*Attesting Officer*        *Director of the United States Patent and Trademark Office*